Feb. 5, 1957 D. A. HOLLEY 2,780,412
AUTOMATIC TEMPERATURE CONTROL FLUID MIXING VALVE
Filed Sept. 9, 1953 2 Sheets-Sheet 1

INVENTOR.
Donald A. Holley
BY
ATTORNEYS

Feb. 5, 1957 D. A. HOLLEY 2,780,412
AUTOMATIC TEMPERATURE CONTROL FLUID MIXING VALVE
Filed Sept. 9, 1953 2 Sheets-Sheet 2
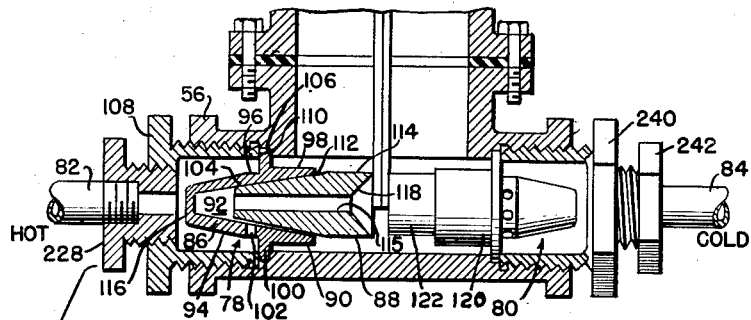
FIG. 5.
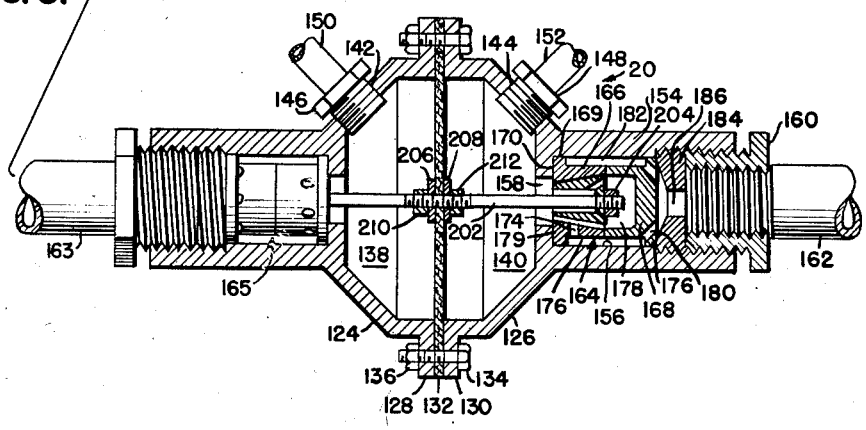
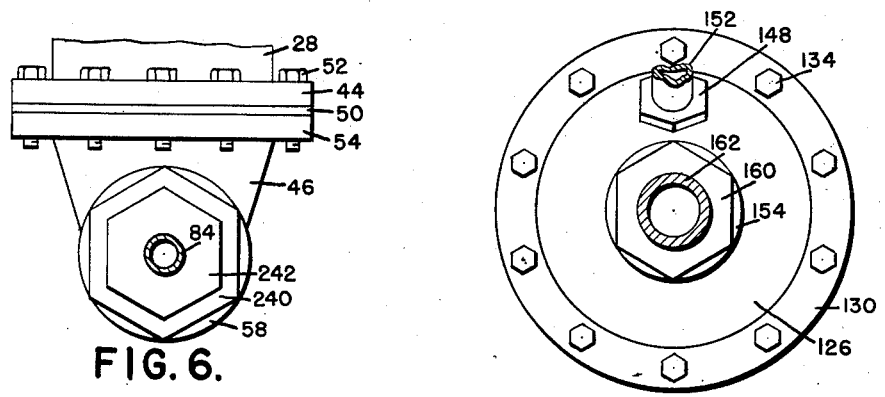
FIG. 6.
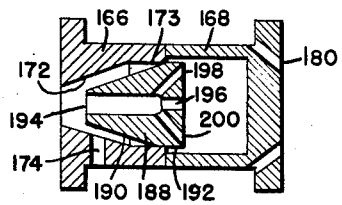
FIG. 8.
FIG. 7.
*INVENTOR.*
Donald A. Holley
BY
*ATTORNEYS*

United States Patent Office 2,780,412
Patented Feb. 5, 1957

2,780,412

AUTOMATIC TEMPERATURE CONTROL FLUID MIXING VALVE

Donald A. Holley, Waverly, Iowa

Application September 9, 1953, Serial No. 379,277

8 Claims. (Cl. 236—12)

The present invention relates to improvements in fluid mixing valves and more particularly to temperature controlled fluid mixing valves such as for controlling the temperature of mixed hot and cold water from inlet lines of fixed or variable temperature and pressure.

Heretofore in attempts to control water mixing to achieve desired temperature control of the mixed discharge water considerable difficulty has been encountered. Although much has been done toward achieving temperature control, for the most part prior arrangements have not given control which has been to any degree of fineness. Especially where prior art arrangements have utilized thermostatic units, such as bimetal elements or gases, I have found that the elements connected therewith or operatively associated therewith provide such frictional drag that small temperature variations are inconsequential when it comes to overcoming such drag because of the relatively slight force exerted by such thermostatic units. Although it might be suggested that larger or more heavy thermostatic units could be substituted which would provide the necessary force to overcome the drag, it must be realized that from a practical standpoint, size and economy are of material significance.

Therefore, it is a primary object of my invention to provide an improved temperature controlled fluid mixing valve which will overcome the difficulties heretofore encountered and above referred to and which will be responsive to small temperature variations and operative in consequence of the small temperature changes to provide for variation in the proportioning of the incoming fluid to correct for the change in temperature.

Another object of the present invention is to provide an improved mixing valve embodying thermostatic means operatively responsive to slight temperature changes to vary the proportionate opening of valve means controlling the incoming fluids.

A further object of the present invention is to provide an improved mixing valve having thermostatically controlled inlet valve means wherein the minimum force is required for operation of the valve means. A feature of the invention is that the valves are freely reciprocable relative to their seats and require no means such as springs or the like for movement thereof.

A still further object of the present invention is to provide an improved mixing valve wherein pressure equalizing means is provided and which means is effective in response to variations in the proportionate openings of the inlet valves of the mixing valve to respond to the pressure change occasioned by such variations to similarly vary the proportionate openings of other valve means so as to more quickly bring about the required proportion of fluids to be mixed as necessitated by a particular thermostatic setting.

Another object of the present invention is to so arrange the valve means associated with the mixing valve proper and the pressure equalizing means that the valves thereof are freely reciprocable and the valve openings associated therewith extend for only partial circumferential portions of the valve seat whereby the valves when moving to open position not only move axially away from the seat but also radially away from the valve seat openings.

Various other objects and advantages will become apparent from the detailed description to follow.

The best form in which I have contemplated applying my invention is clearly illustrated in the accompanying drawings wherein:

Fig. 5 is an enlarged detail sectional view of the valve arrangements in the inlet to the mixing valve body and the pressure equalizing housing;

Fig. 6 is an end elevational view of the bottom portion of the mixing valve body;

Fig. 7 is an end elevational view of the pressure equalizing housing; and

Fig. 8 is a sectional view showing the details of one of the valve means of the pressure equalizing means.

Figure 1:
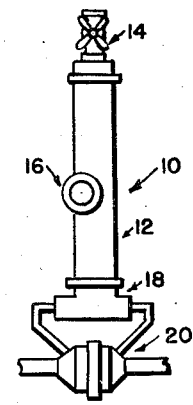
Fig. 1 is an elevational view of the automatic temperature controlled valve of the present invention.

Referring more particularly to the drawings wherein like numerals designate like parts, it will be seen that the mixing valve 10 of the present invention is comprised of valve body 12, outlet valve 14, thermostatic control means 16, valve inlet means 18 associated with the control means 16, and pressure equalizing means 20.

Figure 3:
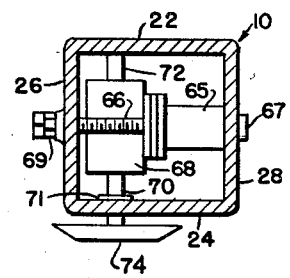
Fig. 3 is a horizontal cross-sectional view as taken along the plane of line 3—3 of Fig. 2.

The valve body 10 is of generally rectangular cross section as seen in Fig. 3 and includes front and rear elongated walls 22, 24 joined by elongated side walls 26, 28, the upper end of the walls 22—28 being outwardly flanged at 30 to which the flange 32 of dome portion 34 is attached, a sealing gasket 36 being interposed between the flanges and bolts 38 joining the flanges. The dome portion has a threaded opening at 40 in which a pipe section 42 is received. A conventional discharge or outlet control valve 14 is interposed in the pipe section 42. The lower extremities of the walls 22—28 also are provided with outturned flanges at 44.

The valve inlet means 18 includes a casing portion 46 the upper end of which is open at 48 for communication with the interior of the valve body 12. The casing portion 46 is flanged at 50 for attachment to the flange 44 by the bolts 52 with the gasket 54 between the flanges. The casing portion 46 further is provided with aligned arms 56, 58 in which are carried the valve inlet means 18 to be described in detail hereinafter.

The thermostatic control unit 16 includes a bimetal strip or strap 60, 62 the upper end 64 of which is secured to an end of the arcuated flat brass spring 65 and supported thereby, the spring 65 being secured to the body by means of a bolt at 67. The opposite end of the spring 65 is provided with a slidable saddle connection through which an intermediate portion of the bimetal strap 60, 62 is slidably engaged so as to compensate for the change in length of the spring as a result of compression thereof. An adjustment screw 66 is threadably engaged through the valve body and terminates in a shoulder against which the upper end 64 of the bimetal strap abuts. A lock nut 69 is provided on the screw 66 for locking after calibrating the dial. Intermediate the ends of the bimetal strip 60, 62 the valve body has an eccentrically mounted cam 68 which contacts the strip 60, 62 for controlled movement thereof. The cam 68 has support pins 70, 72 extending therefrom for support by the front and rear walls 22, 24. One of the pins 70 extends through a packing gland 71 in its respective wall 24 and has a control dial 74 secured thereto. Beneath the dial 74 on the wall 24 indicia is provided whereby the desired water temperature can be obtained by proper setting of the dial relative to the indicia, as will be understood. The spring 65 while shown to be of flat arcuate form may assume other forms, of course, its functional requirement being primarily to protect the bimetal strip from objectionable bending or distorting when the selector cam 68 is rotated to a high or low extreme before the water temperature has changed the curvature of strap 60, 62 to the selected temperature.

Figure 2:
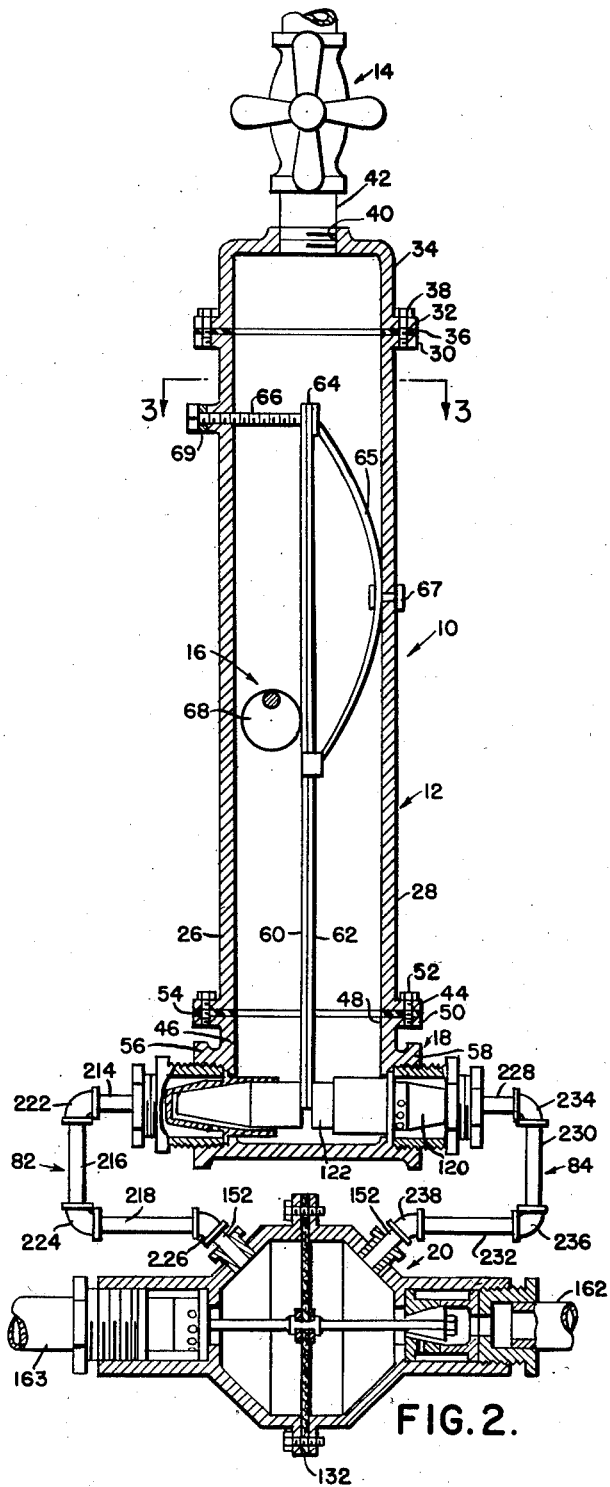
Fig. 2 is an enlarged vertical sectional view of the valve of Fig. 1.

Referring now to Figs. 2 and 5, it will be seen that the valve inlet means 18 includes a pair of valve assemblies 78 and 80 each controlling the inflow of hot and cold water from the pipes or conduits 82 and 84, respectively. The valve assembly 78 is comprised of a valve seat element 86 and valve head element 88. The seat element 86 includes a substantially conical interior seating surface 90 and a flat and closed end 92, with the exterior of the element being substantially conical at 94, cylindrical at 96 and cylindrical at 98, the latter cylindrical portion being of greater diameter than the former. An annular flange 100 encircles the seat element 86 between the two cylindrical portions 96, 98. A partial circumferential portion of the seat element at the cylindrical portion 96 is apertured as at 102, the topmost circumferential portion being imperforate at 104. The arm 56 is interiorly formed with an annular shoulder at 106 against which the flange 100 is seated. An internally and externally threaded sleeve 108 is threaded into the internal threading of the arm 56 and has its innermost end 110 abutting against the flange 100 to hold the valve seat element firmly in place.

The valve head 88 is predominantly conical in exterior shape having its major portion provided with a conical seating surface 112 with a minor portion being of cylindrical form at 114. The valve head 88 has a bore 115 extending longitudinally therethrough so that upon seating movement fluid can escape from the recess 116 within the valve seat element. The valve head has an internally beveled end at 118, the end edge portion of which is adapted to abut the lower flat end surface of the bimetal strap 60, 62 of the thermostatic unit. It will be noted that the bimetal extends only about half way down the end surface of the valve head 88 and this is to provide sufficient contact for moving the valve while leaving enough open space to permit free intermixing of the incoming fluids.

Valve means 80 is similar to the valve means above described and includes a valve seat element 120 and valve head 122. In view of the similarity a description of one assembly is deemed sufficient for both and therefore like numerals are applied to the component portions of the valve seating elements and valve heads, respectively.

The pressure equalizing means 20 is comprised of a two part casing 124, 126, each part of which has a peripheral flange as at 128, 130 between which is a diaphragm 132 and through which bolts 134 extend for securement with nuts 136 whereby the casing is sealed and divided into two major chambers 138 and 140. Each chamber has an outlet opening as at 142 and 144 in which adaptors 146 and 148 are threadably secured. The hot and cold water inlets 82, 84 to the valve means 78, 80 of the mixing valve body have their end portions 150, 152 threaded into the adaptors 146, 148.

The casing part 126 has a substantially cylindrical extension portion 154 provided with a hollow interior 156 which communicates with the chamber 140 by means of the opening 158, the outer end of the extension portion 154 being internally threaded to receive the union element 160 by which the cold water inlet pipe or conduit 162 is connected to the pressure equalizing means.

Within the hollow interior 156 of the extension portion 154 is a valve means 164 by which the incoming flow of fluid is controlled in response to pressure differentials in the chambers 138 and 140. The valve means 164 includes a pair of valve-enclosing elements 166 and 168, each of which is of generally cylindrical shape. Element 166 has an enlarged end in the form of a peripheral flange 169 which seats against the inner end wall 170 of the chamber 156. The element 166 further has a passageway therethrough with the wall 172 thereof being substantially conical, with the exception of a small cylindrical portion 173, so as to provide a valve seating surface. A plurality of radial apertures 174 are formed through the wall of the element 166 adjacent the flange 169 throughout a partial circumferential portion of the element, the remaining top portion, approximately 25% of the entire circumference, is imperforate. The other element 168 is provided with an annular flange 176 and a recess 178 communicating only with the passageway 172 through seat element 166. Angularly extending passageways or openings 180 are formed through the element 168 at the flange 176 so as to communicate the exterior annular passage 182 with the pipe 162. A centrally apertured and externally threaded element 184 has one face thereof inwardly beveled so that when threaded into abutment with the element 168, for holding elements 166 and 168 in seated unitary relationship, the openings 180 communicate with the central aperture 186 and thus pipe 162.

Within the chamber defined by the elements 166, 168 is a valve head 188, the exterior of which is conical at 190 and cylindrical at 192 so as to be substantially complementary to the surfaces 172, 173 of the element 166. The valve head 188 has a central passageway 194 therethrough which is reduced in diameter at 196 and angularly extending passageways 198 communicate the central passage 194 with the exterior of the flat end face 200 of the valve head. An operating control rod 202 extends through the reduced diameter passage portion 196 and a nut 204 is threaded on the end of the rod to retain the valve head thereon and limit outward movement of the valve head.

The rod 202 extends through a central opening in the diaphragm 132 and washers 206, 208 and nuts 210, 212 sealingly secure the rod and diaphragm for coupled movement.

Inasmuch as the construction and arrangement of valve means 165 is similar to the above described valve means 164 a detailed description thereof is deemed unnecessary and therefore like numerals have been applied to like component parts.

With reference once again to Figs. 2 and 5, it will be seen that pipe 82 includes sections 214, 216, 218 and 152 interconnected by elbows 222, 224, 226. Pipe section 214 threads into adaptor 228 which in turn threads into coupling sleeve 108. Pipe 84 includes sections 228, 230, 232 and 152 interconnected by elbows 234, 236 and 238. The section 228 is connected to element 240 by means of adaptor 242.

Figure 4:
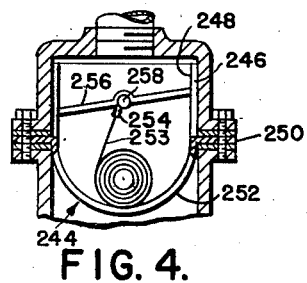
Fig. 4 is a detail view of a temperature limit valve.

In Fig. 4 a temperature limit valve 244 is disclosed in the automatic temperature control mixing valve of the present invention. The valve 244 includes a housing 246 with a passageway 248 therethrough and with an annular flange 250 which is seated between the flanges 30 and 32 for securement. A spider-like portion 252 supports a coil-type thermostatic bimetal strip 253 the free end of which is connected with the arm 254 of a butterfly valve 256. Valve 256 is pivotally supported by the mounting shaft 258 which is journaled in the wall of the housing 246.

In operation, when it is desired to mix hot and cold water and maintain a desired outlet temperature for any purpose as for shower, sink, laboratory, automatic washers, etc., the operator turns the dial 74 to the desired temperature and opens valve 14 to give desired rate of discharge. At the setting of the dial 74 as, for example to give water at 110° F., the cam 68 will assume a particular relationship which will position the bimetal at some point to the right, closing off the cold water valve 80 and opening hot water valve 78 to allow hot water to enter mixing valve body. After a sufficient amount of hot or warm water has entered to raise the water temperature in the mixing valve body to the selected temperature, the bimetal will travel to the left so as to reduce the amount of hot water to that required to produce the selected temperature. Thereafter the bimetal will move to readjust the proportionate valve opening to maintain the selected water outlet temperature.

If, however, the bimetal tends to close the hot water valve 78, for example, the valve 78 will in moving toward closed position cause a back pressure which will increase the pressure in chamber 138 a slight amount over that in chamber 140 at the other side of the diaphragm 132. The large area of the diaphragm 132 works to move the same to the right tending to close off the hot water inlet valve 165 and simultaneously to open cold water inlet valve 164, until pressure equalization is reached, thus aiding the thermostatic bimetal strip to effectuate the change in proportioning of incoming fluids to maintain the desired temperature.

Furthermore, if a drop in cold water inlet line pressure should occur as a result of the opening of a faucet at some other point in the plumbing system, the pressure in chamber 140 will drop causing the diaphragm 132 to move to the right, tending to close hot water valve 165 and thus establishing pressure equalization of the hot and cold water fed to the inlet valves 78 and 80.

It will thus be seen that a minimum force is required of the bimetal to achieve a change in the proportioning of the inlet valve openings and also that pressure equalizing means cooperating therewith provide for close temperature control. Furthermore, because of the disposition of openings or apertures, as in valve seat elements 86 and 166, etc., the valve heads, which are not spring loaded but are free to reciprocate relative to the openings, will have the inflowing pressure greater on one side where the apertures are located than on the other side and the head will be held against the seat on the non-apertured side so that chatter will be positively eliminated. The openings through the valve heads are for the purpose of exhausting fluid therethrough so as to minimize the obstruction to freedom of reciprocation of the valve heads.

The temperature limit valve functions only in the event that an excess water temperature is encountered, the reasons for which may be that the unit is set to a temperature which may be too high. The thermostatic bimetal will at excessive temperatures, effect rotation of the butterfly valve to closed position. The operator will thus be required to set the dial to a lower outlet temperature.

The adjusting screw 66 may be utilized to adjust the positioning of the bimetal relative to the cam so as to correct the relationship between the dial readings and temperatures of the outlet water.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as con-jointly cooperative equivalents, are therefore intended to be embraced by those claims.

I claim:

1. A mixing valve comprising a body having an outlet and a pair of inlets for relatively hot and cold fluids to be mixed in the body, valve means in said inlets for varying the flow from at least one of said inlets into the body, temperature actuated means cooperable with said valve means for varying the proportionate flow through said inlets so as to provide mixed fluid at a selected temperature, fluid supply connections, fluid pressure equalizing means communicating with said inlet valve and said supply connections and responsive to pressure differential to control the incoming flow of at least one of the fluids from its respective supply connection, said pressure equalizing means includes a casing, a diaphragm dividing said casing into a pair of chambers, said supply connections each being connected to said casing for communication with one of said chambers, and outlets communicating each of said chambers with a respective valve means, said supply connections each having a valve seat member therein provided with a substantially conical recessed seat, a partial circumferential portion of said valve seat member having perforations therethrough opening laterally through said seat, a valve head having a substantially conical surface complementary to said seat and reciprocable relative to each valve seat and alternately positively moved toward valve seating relationship by pressure differentials in said chambers to close said perforations, the pressure differentials being occasioned by an increased or decreased demand for either fluid or a drop or increase in pressure of the fluid entering the fluid supply connections.

2. A mixing valve comprising a body having an outlet and a pair of inlets for relatively hot and cold fluids to be mixed in the body, valve means in said inlets for varying the flow from at least one of said inlets into the body, temperature actuated means cooperable with said valve means for varying the proportionate flow through said inlets so as to provide mixed fluid at a selected temperature, fluid supply connections, fluid pressure equalizing means communicating with said inlet valve and said supply connections and responsive to pressure differential to control the incoming flow of at least one of the fluids from its respective supply connection, said pressure equalizing means includes a casing, a diaphragm dividing said casing into a pair of chambers, said supply connections each being connected to said casing for communication with one of said chambers, and outlets communicating each of said chambers with a respective valve means, said supply connections each having therein a pair of valve seat elements cooperatively associated together to provide a valve chamber, one of said seat elements having a substantially conical seating surface, a partial circumferential portion of said one seat element having perforations therethrough opening laterally through said seating surface and providing a fluid passage between said valve chamber and the supply connection, a valve head in the valve chamber provided by each pair of seat elements, each valve head having a substantially conical surface complementary to said seating surface and being reciprocable relative to a valve seat element and alternately positively moved toward valve seating engagement with the adjacent seating surface by pressure differentials in said chambers, the pressure differentials being occasioned by an increased or decreased demand for either fluid or a drop or increase in pressure of the fluid entering the fluid supply connections.

3. A mixing valve comprising a body having an outlet and a pair of inlets for relatively hot and cold fluids to be mixed in the body, valve means in said inlets for varying the flow from at least one of said inlets into the body, temperature actuated means cooperable with said valve means for varying the proportionate flow through said inlets so as to provide mixed fluid at a selected temperature, fluid supply connections, fluid pressure equalizing means communicating with said inlet valve and said supply connections and responsive to pressure differential to control the incoming flow of at least one of the fluids from its respective supply connection, said pressure equalizing means includes a casing divided into a pair of chambers, said supply connections each being connected to said casing for communication with one of said chambers, and outlets communicating each of said chambers with a respective valve means, said supply connections each having an elongate hollow valve seat element therein provided with a substantially conical seating surface, a partial circumferential portion of said conical seating surface having perforations therethrough opening laterally into the supply connection, a valve head having a substantially conical surface complementary to said seating surface and reciprocable in the hollow seat element relative to the seating surface and alternately positively moved toward valve seating engagement with said surface by pressure differentials in said chambers, the pressure differentials being occasioned by an increased or decreased demand for either fluid or a drop or increase in pressure of the fluid entering the fluid supply connections.

4. A mixing valve comprising a body having an outlet and a pair of inlets for relatively hot and cold fluids to be mixed in the body, valve means in said inlets for varying the flow from at least one of said inlets into the body, temperature actuated means cooperable with said valve means for varying the proportionate flow through said inlets so as to provide mixed fluid at a selected temperature, fluid supply connections, fluid pressure equalizing means communicating with said inlet valve and said supply connections and responsive to pressure differential to control the incoming flow of at least one of the fluids from its respective supply connection, said pressure equalizing means includes a casing divided into a pair of chambers, said supply connections each being connected to said casing for communication with one of said chambers, and outlets communicating each of said chambers with a respective valve means, said supply connections each having therein a pair of valve seat elements cooperatively associated together to provide a valve chamber, the chamber portion of one of said seat elements having a substantially conical seating surface, a partial circumferential portion of said one seat element having a number of perforations therethrough leading from the supply connection into the chamber through said seating surface, a valve head in the valve chamber provided by each pair of seat elements, each valve head having a substantially conical surface complementary to said seating surface and being reciprocable relative to a valve seat element and alternately positively moved toward valve seating relationship by pressure differentials in said chambers, the pressure differentials being occasioned by an increased or decreased demand for either fluid or a drop or increase in pressure of the fluid entering the fluid supply connections.

5. A mixing valve comprising a body having an outlet and a pair of inlets for relatively hot and cold fluids to be mixed in the body, valve means in said inlets for varying the flow from at least one of said inlets into the body, temperature actuated means cooperable with said valve means for varying the proportionate flow through said inlets so as to provide mixed fluid at a selected temperature, fluid supply connections, fluid pressure equalizing means communicating with said inlet valve and said supply connections and responsive to pressure differential to control the incoming flow of at least one of the fluids from its respective supply connection, said pressure equalizing means includes a casing, a diaphragm dividing said casing into a pair of chambers, said supply connections each being connected to said casing for communication with one of said chambers, and outlets communicating each of said chambers with a respective valve means, said supply connections each having therein a pair of valve seat elements cooperatively associated together to provide a valve chamber, the chamber portion of one of said seat elements having a substantially conical seating surface, a partial circumferential portion of said one seat element having perforations therethrough opening through said seating surface, a valve head in the valve chamber provided by each pair of seat elements, each valve head having a substantially conical surface complementary to said seating surface and being reciprocable relative to a valve seat element and alternately positively moved toward valve seating relationship by pressure differentials in said chambers, the pressure differentials being occasioned by an increased or decreased demand for either fluid or a drop or increase in pressure of the fluid entering the fluid supply connections, the other of said valve seat elements of each pair providing imperforate walls bounding the valve chamber defined by each pair of valve seat elements and providing passageway externally of each pair of seat elements to the exterior of the perforated portion of the one seat element of each pair for admission of fluid from the supply connection to the chamber through the said perforated portion.

6. A mixing valve comprising a hollow body having an outlet and a pair of inlets for the fluids to be mixed in the body, valve means in said outlets for varying the flow from at least one of said inlets into the body, each said valve means including an elongate substantially conical seat and an elongate substantially conical freely movable head having the smaller end, in the open position of the valve, within and slidably supported on a portion of the seat, each conical seat having a fluid flow aperture therethrough directed transversely of the line of movement of the head, fluid supply connections, valves in said fluid supply connections, and fluid pressure equalizing means communicating with said inlet valves and said fluid supply valves and responsive to pressure differential to control the incoming flow through at least one of the fluid supply valves.

7. A fluid mixing valve comprising a body having a mixing chamber, a pair of inlets for admission thereinto of relatively hot and cold fluids and an outlet, each of said inlets embodying a tubular arm, valve means in each tubular arm and including a stationary elongate valve seat element partitioning the arm and having a conical recess open at its larger end and providing a conical valve seat, said elements being arranged with the open ends of the recesses in spaced opposed relation, means for connecting a fluid supply with each tubular member at the end of the seat element remote from the large end of the recess, said seat element each having apertures directed laterally through a partial circumferential portion for establishing communication between the recess therein and the adjacent fluid supply, a free moving head element forming a part of each valve means and having a substantially conical portion extending into the seat element recess and adapted to position on said seat to close said apertures, a temperature responsive element supported in said chamber and having a free moving terminal portion disposed between and adapted to engage said head elements, means for selectively setting said temperature responsive element to proportion the relative opening of the valve means to provide for the control of the temperature of the mixed fluids, a pressure equalizing means including a casing, means dividing the casing into two parts providing two separate chambers, said casing dividing means being movable in response to differential pressures applied to opposite sides thereof, a fluid connection between each chamber and one of said fluid supply means, a fluid inlet connected with each chamber and a valve in each fluid inlet operatively coupled with said casing dividing means.

8. A fluid mixing valve comprising a body having an elongate mixing chamber, a pair of inlets adjacent one end thereof for admission thereinto of relatively hot and cold fluids and an outlet, each of said inlets embodying a tubular arm, valve means in each tubular arm and including a stationary elongate valve seat element partitioning the arm and having a conical recess open at its larger end and providing a conical valve seat, said elements being arranged with the open ends of the recesses in spaced opposed relation, means for connecting a fluid supply with each tubular member at the end of the seat element remote from the large end of the recess, said seat elements each having apertures through a partial circumferential portion for establishing communication between the recess therein and the adjacent fluid supply, a free moving head element forming a part of each valve means and having a substantially conical portion extending into the seat element recess and adapted to position on said seat to close said apertures, an elongate bimetallic temperature responsive element supported adjacent to one end in the chamber to extend lengthwise thereof and having its other end portion disposed between said head elements, means for selectively setting said temperature responsive element to proportion the relative opening of the valve means to provide for the control of the temperature of the mixed fluids, a pressure equalizing means including a casing, means dividing the casing into two parts providing two separate chambers, said casing dividing means being movable in response to differential pressures applied to opposite sides thereof, a fluid connection between each chamber and one of said fluid supply means, a cylindrical extension on each casing part opening into a chamber, means for connecting a fluid inlet to each extension, a valve structure in each extension including a cylindrical body having flanged ends maintaining the portion of the body therebetween spaced from the wall of the enclosing extension, said body being interiorly formed to provide a valve chamber tapered toward an opening into the casing part to form a substantially conical valve seat, the flange at the end of said cylindrical body adjacent to the fluid inlet being formed to pass fluid into the space between the flanges, the wall of the cylindrical body between the flanges having fluid passing apertures through a partial circumferential portion thereof opening into the valve chamber through the valve seat, a substantially conical valve head in each valve chamber adapted to engage on said valve seat, and an operative coupling between each of the last mentioned valve heads and said casing dividing means for moving the last mentioned heads simultaneously relative to said seats in response to pressure differentials in said casing chambers.

References Cited in the file of this patent

UNITED STATES PATENTS

| | | |
|---|---|---|
| 790,584 | Manning | May 23, 1905 |
| 1,289,349 | Zimmer | Dec. 31, 1918 |
| 1,364,001 | Shadduck | Dec. 28, 1920 |
| 1,508,938 | Powers | Sept. 16, 1924 |
| 1,707,630 | Erceg | Apr. 2, 1929 |
| 1,714,758 | Bloch | May 28, 1929 |
| 1,724,504 | Murdoch | Aug. 13, 1929 |
| 1,932,148 | Schneider et al. | Oct. 24, 1933 |
| 1,984,892 | Phillips | Dec. 18, 1934 |
| 2,099,563 | Henning | Nov. 16, 1937 |
| 2,159,129 | Brush | May 23, 1939 |
| 2,250,815 | Ruegg et al. | July 29, 1941 |
| 2,526,099 | Vinson | Oct. 17, 1950 |
| 2,534,378 | Schlaich | Dec. 19, 1950 |
| 2,550,069 | Kirk et al. | Apr. 24, 1951 |
| 2,553,027 | Wianco | May 15, 1951 |